Figure 1:
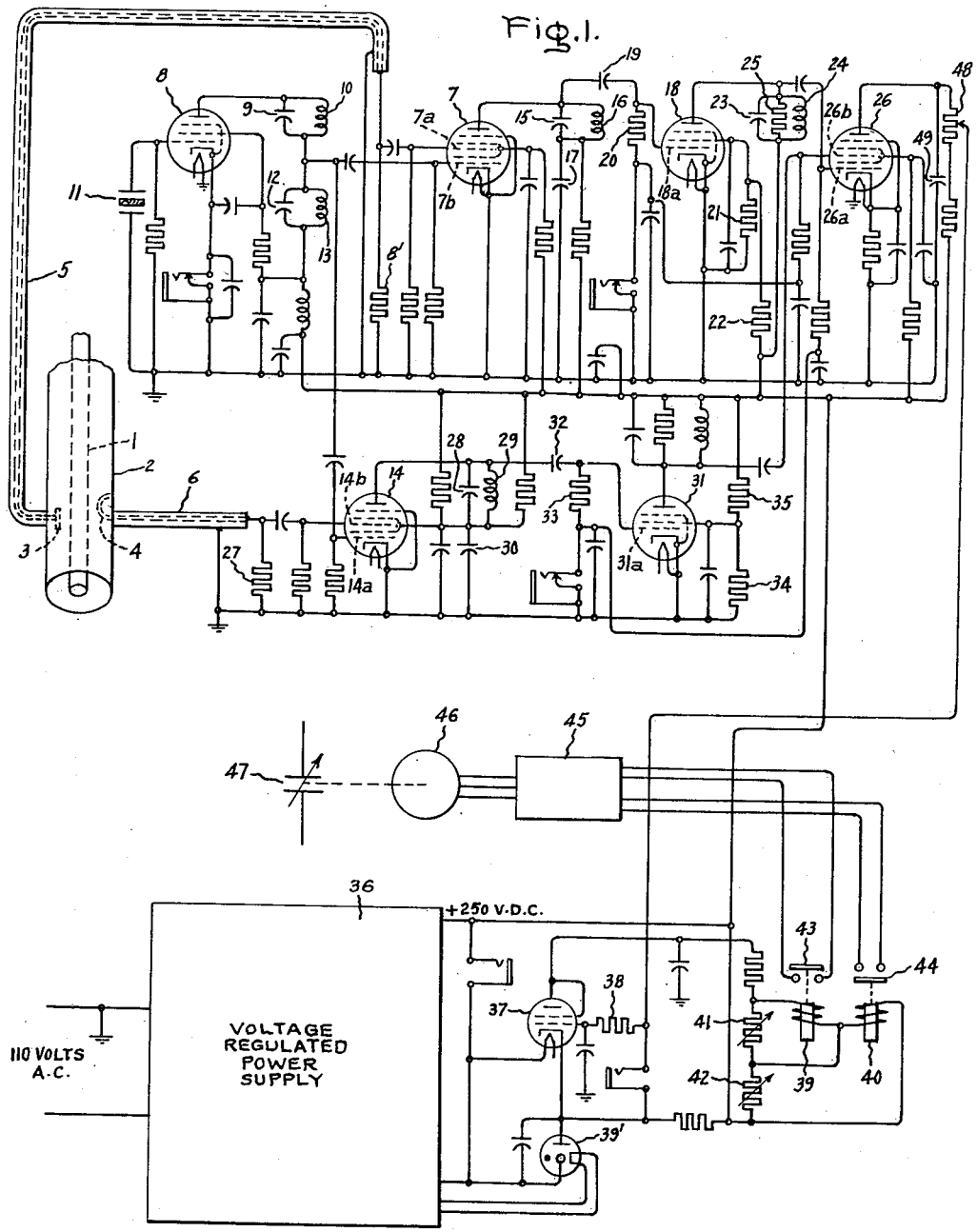

March 4, 1952

J. VAHLE ET AL 2,588,181

HIGH-FREQUENCY PHASE ANGLE RESPONSIVE CIRCUIT

Filed Nov. 26, 1948

2 SHEETS—SHEET 1

Inventors:
Julius Vahle,
Francis E. Goodness,
Paul D. Heath,
by
Their Attorney.

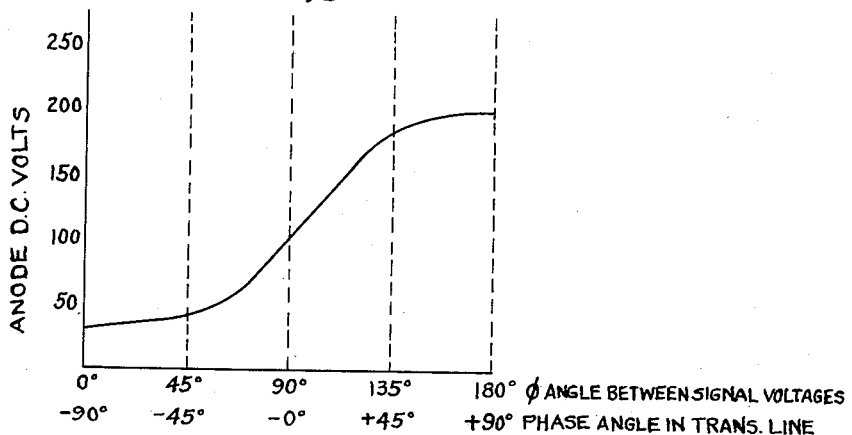
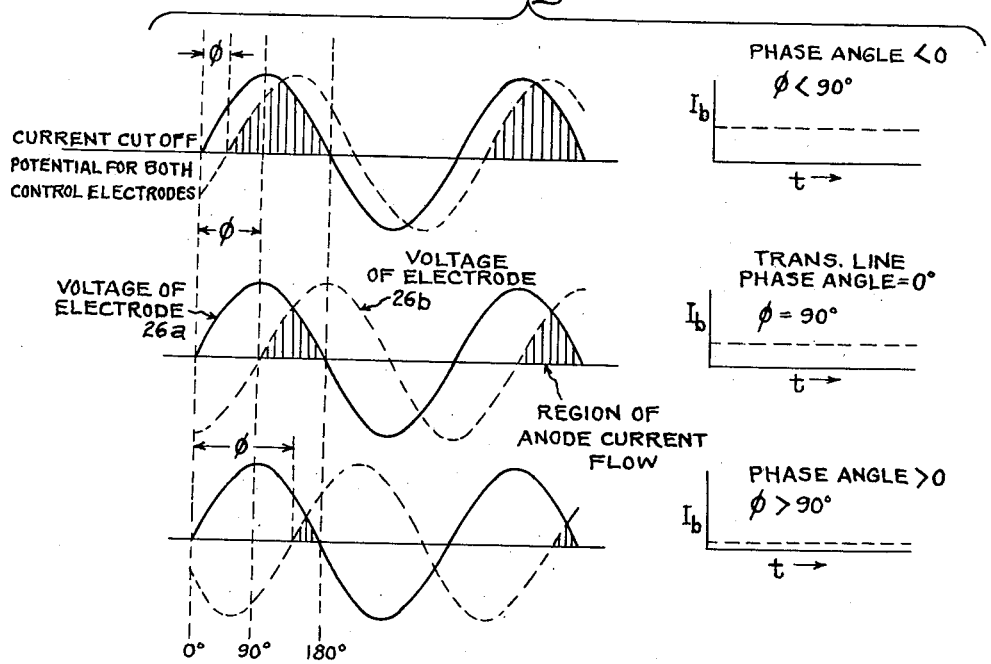

UNITED STATES PATENT OFFICE 2,588,181

HIGH-FREQUENCY PHASE ANGLE RESPONSIVE CIRCUIT

Julius Vahle, Francis E. Goodness, and Paul D. Heath, Syracuse, N. Y., assignors to General Electric Company, a corporation of New York Application November 26, 1948, Serial No. 62,172

2 Claims. (Cl. 172—245)

Our invention relates to phase angle responsive circuits of the type employed in conjunction with alternating current electrical systems, and more particularly to phase angle responsive circuits of the type used with high frequency systems employing concentric conductor or waveguide transmission lines. It is the object of our invention to provide a circuit which responds accurately to the phase angle between the voltage and the current in a high frequency alternating current transmission line.

A circuit or system which is accurately responsive to the phase angle between the voltage and the current in a transmission line is an essential element of automatic tuning systems such as that covered by patent application Serial No. 62,173, now Patent No. 2,523,791, issued September 26, 1950, of Julius Vahle and Paul D. Heath which is filed concurrently with the present application and which is assigned to the assignee of the present application. Such a phase responsive circuit is also useful in any case where it is desired to provide an indication of the phase angle between the voltage and current in an alternating current circuit or where it is desired to actuate a recording instrument to make a record of the variation of such a phase angle.

In carrying out our invention in one form, we provide means for deriving two signal voltages from a high frequency transmission line of the concentric conductor type. One signal voltage, derived by a probe inserted in the transmission line, is in phase with the voltage in the transmission line. The second signal voltage, derived by a loop inserted in the transmission line at the same point, is separated by ninety electrical degrees from the current therein. Both of these signal voltages, after being acted upon by means of electron discharge devices to reduce their frequency and stabilize voltage amplitude variations within readily usable limits, are applied to the control electrodes of a phase detector tube. The voltage output of this tube or electron discharge device varies in accordance with the phase angle between voltage and current in the transmission line.

For a more complete understanding of our invention, reference should be had to the attached drawing, Fig. 1 of which is an electrical circuit diagram of one embodiment of the invention; Fig. 2 is a curve showing the variation in anode voltage of the phase detector tube with phase angle variation in the transmission line; while Fig. 3 illustrates how the phase detector tube of our invention functions to vary the anode current of the phase detector tube.

Referring to Fig. 1 of the drawing, there is shown a concentric conductor transmission line of the air dielectric type composed of a center conductor 1 and an outside tubular conductor 2. Inserted in the transmission line through openings in outer conductor 2 are a probe 3 and a loop 4. Probe 3 acts as a potential divider between center conductor 1 and outer conductor 2 of the transmission line to derive a small signal voltage that is proportional to and in phase with the transmission line voltage at that point. The signal voltage from probe 3 is transmitted through a small concentric conductor 5 to a phase angle responsive circuit.

Loop 4 in the transmission line through its linkage with the electromagnetic field within the line has induced in it a small signal voltage whose magnitude is proportional to the current in the transmission line and which is separated from the current by ninety electrical degrees. The signal voltage from loop 4 is transmitted through concentric conductor 6 to the phase angle responsive circuit.

In the operation of the phase angle responsive circuit, the signal voltage from probe 3 which is transmitted through conductor 5 is applied to control electrode 7a of an electron discharge device 7. Concentric conductor 5 is terminated in a resistor 8', the impedance of which is equal to the characteristic impedance of conductor 5, to minimize power reflections and standing waves on conductor 5.

Electron discharge device 8 is a beam power tetrode connected into a conventional crystal oscillator circuit. Capacitance 9 and inductance 10 form a resonant oscillatory circuit which is tuned to the fundamental frequency of piezoelectric crystal 11. An additional resonant circuit comprising a capacitor 12 and inductance 13 is tuned to the third harmonic frequency of crystal 11, and the voltage of this harmonic frequency developed across a resonant circuit 12, 13 is impressed on a control electrode 7b of electron discharge device 7 and control electrode 14a of electron discharge device 14.

Electron discharge device 7 is a conventional type of pentagrid converter or mixer. The output current of this tube contains components comprising both the sum and difference of the two input frequencies which are applied to control electrodes 7a and 7b. The anode circuit of electron discharge device 7 comprising capacitor 15 and inductance 16 is tuned to the difference frequency. High frequency components are by-passed to ground through capacitor 17. On large signals, the output voltage of electron discharge device 7 increases only a fraction when the input signal voltage applied to control electrode 7a increases several times. Hence, electron discharge device 7 functions also as a limiter on large input signals.

The voltage developed across resonant circuit 15, 16 is impressed on control electrode 18a of an electron discharge device 18 through capacitor 19. Electron discharge device 18 functions as a limiter; that is, the output voltage of device 18 is substantially constant regardless of the magnitude of the signal voltage applied to control electrode 18a. This limiting action is obtained by the use of a resistor 20 to provide a grid bias which increases with increasing signal input and the use of a low screen electrode voltage to reduce the anode current. The low screen electrode voltage is obtained by the use of large resistors 21 and 22 in the screen electrode circuit of electron discharge device 18. Capacitor 23 and inductance 24 constitute a resonant circuit in the output circuit of electron discharge device 18. A resistor 25 provides this circuit with a relatively broad band pass characteristic. Due to the amplitude-limiting action of device 18, the output voltage of tuned circuit 23, 24 remains substantially constant even though the signal voltage from probe 3 varies over a wide range of amplitudes.

The constant output voltage of device 18 is impressed on control electrode 26a of an electron discharge device 26, the operation of which is described below.

The signal voltage induced in loop 4 is transmitted through concentric conductor 6 and impressed on control electrode 14b of an electron discharge device 14. Concentric conductor 6 is terminated in a resistor 27, the impedance of which is equal to the characteristic impedance of conductor 6 to minimize power reflections and standing waves thereon. Concentric conductor 6 and concentric conductor 4 are of equal length so that equal phase delay occurs in both conductors.

When the high frequency voltage from loop 4 is applied to electrode 14b and the voltage from resonant circuit 12, 13 is impressed on electrode 14a, electron discharge device 14 functions as a mixer and limiter in a manner similar to that of electron discharge device 7. The output current of device 14 contains components comprising both the sum and difference of the two input frequencies. The anode circuit of electron discharge device 14 comprising capacitor 28 and inductance 29 is tuned to the difference frequency while high frequency components are by-passed to the ground by capacitor 30. On large signals, the output voltage of electron discharge device 14 increases only a fraction when the input signal voltage applied to electrode 14b increases several times; thus, electron discharge device 14 functions also as a limiter.

The voltage developed across resonant circuit 28, 29 is impressed on control electrode 31a of an electron discharge device 31 through capacitor 32. Electron discharge device 31 functions as a limiter in a manner similar to device 18. The limiting action is obtained by the use of a resistor 33 to provide a grid bias which increases with increasing signal input and the use of a low screen voltage to reduce the anode current. The low screen voltage is obtained by the use of large resistors 34 and 35 in the screen electrode circuit of electron discharge device 31. The output voltage of device 31 is substantially constant regardless of the magnitude of the signal voltage applied to control electrode 31a. This constant output voltage is impressed on control electrode 26b of electron dischage device 26.

Electron discharge device 26 functions as a phase detector when the signal voltages originating in probe 3 and loop 4 are applied to control electrodes 26a and 26b. The output voltage of device 26 varies in accordance with the phase angle in transmission line 1, 2. This variation is illustrated in Fig. 2 of the accompanying drawing for the case when the anode circuit of device 26 is supplied, for example, with a unidirectional operating voltage of 250 volts. It should be noted that the angle $\phi$ which appears in Figs. 2 and 3 relates to the two signal voltages and is not a direct indication of the phase angle between current and voltage in transmission line 1, 2. Inasmuch as the signal voltage derived by loop 4 lags the current in the transmission line by ninety electrical degrees, the angle $\phi$ shown in Fig. 2 equals the phase angle in transmission line 1, 2 plus ninety degrees.

The curves of Fig. 3 illustrate how control electrodes 26a and 26b function as overlapping gates to control the anode current of device 26 and how the average anode current varies with variation in the angle between the two signal voltages and with the phase angle in the transmission line. Inasmuch as both control electrodes must be of above cutoff potential with respect to the cathode of device 26 to permit current to flow through device 26, the difference in phase angle between the two control voltages affects the flow of such current. As shown in Fig. 3, the difference in phase angle determines the portion of each cycle during which both signal voltages are above cutoff potential and thus determines the portion of each cycle during which current flows in the anode circuit of device 26. By controlling the portion of the cycle during which anode current flows, the phase angle in transmission line 1, 2 therefore governs the average amount of current flow through device 26.

Fig. 1 of the accompanying drawing shows, in addition to the phase angle responsive circuit, one application of it. The anode circuit of electron discharge device 26 may be supplied with a unidirectional operating voltage from a conventional voltage regulated power source 36. The output voltage of device 26 may vary, for example, from plus 30 volts D. C. to plus 200 volts D. C. when operated from a 250 volt D. C. supply as the phase angle in transmission line 1, 2 varies from minus 90° to plus 90°. This varying output voltage results from the varying flow of the unidirectional component of the anode current of device 26 through a resistor 48. The unidirectional component of the anode current is indicated as $I_b$ in Fig. 3 on the accompanying drawing. It can readily be seen in Fig. 3 that there is also an alternating component of the anode current of device 26. This alternating component is by-passed to ground by a capacitor 49 and in this manner the alternating component of the output voltage of device 26 is substantially eliminated.

The unidirectional output voltage of device 26 is impressed on the control electrode of an electron discharge device 37 through a voltage dropping resistor 38. The cathode of device 37 is maintained at a constant positive potential with respect to ground by an electron discharge device 39' of the gas-filled voltage regulator type. Hence, the unidirectional output voltage of device 26 varies between predetermined negative and positive voltage limits relative to the cathode of device 37. This voltage is impressed on the grid of device 37 except that voltage dropping resistor 38 prevents the grid potential from becoming positive.

The output voltage of device 37 may be impressed across two solenoids 39 and 40 in series. Variable rheostats 41 and 42 may be connected in parallel respectively with solenoids 39 and 40 to provide means for adjusting the relative currents in the two solenoids.

Switches 43 and 44 may be operated respectively by solenoids 39 and 40 to energize a reversing motor controller 45. Motor 46 operated by reversing control 45 may be used, for example, to adjust a variable capacitor 47 which forms a part of an automatic tuning system.

A modification of our invention is to use the output voltage of electron discharge device 26 to energize a conventional unidirectional voltmeter which is calibrated to indicate directly the phase angle between current and voltage in concentric conductor transmission line 1, 2.

While we have illustrated and described one embodiment of our invention together with one modification, many additional modifications will occur to those skilled in the art. It should be understood, therefore, that we intend by the appended claims to cover any such modifications as fall within the true spirit and scope of our invention.

What we claim as new and desire to secure by Letters Patent of the United States is:

1. A phase angle responsive system for use with a high frequency transmission line of the concentric conductor type comprising probe means for deriving a first primary signal voltage proportional to and in phase with the voltage in said transmission line, loop means for deriving a second primary signal voltage proportional to the current in said transmission line and lagging said current by ninety electrical degrees, a source of reference voltage of substantially constant frequency, means for deriving two secondary signal voltages each responsive to a different one of said primary signal voltages, the frequency of said secondary signal voltages being equal to the difference between the frequency in said transmission line and said constant reference frequency, means for limiting each of said secondary signal voltages to a substantially constant value regardless of variations in amplitude of said primary signal voltages, and means for deriving a final voltage responsive to positive and negative phase angles between the voltage and current in said transmission line, said means comprising an electron discharge device having at least two control electrodes, means for supplying a first of said secondary voltages to one of said control electrodes, and means for supplying the other of said secondary voltages to the other of said control electrodes.

2. A phase angle responsive circuit comprising means for deriving a signal voltage responsive to and in phase with the voltage in a high frequency electrical circuit, means for deriving a second signal voltage responsive to and out of phase with the current in said electrical circuit, and means utilizing said two signal voltages for deriving a third voltage responsive to positive and negative phase angles between the current and voltage in said electrical circuit, said means comprising an electron discharge device having a plurality of control electrodes, limiter means for impressing a signal derived from said first signal voltage on one of said electrodes, and limiter means for impressing a signal derived from said second signal voltage on a second of said electrodes.

JULIUS VAHLE.
FRANCIS E. GOODNESS.
PAUL D. HEATH.

REFERENCES CITED

The following references are of record in the file of this patent:

UNITED STATES PATENTS

| Number | Name | Date |
|---|---|---|
| 1,728,835 | Petch | Sept. 17, 1929 |
| 1,999,250 | Mollath et al. | Apr. 30, 1935 |
| 2,183,399 | Heising | Dec. 12, 1939 |
| 2,223,840 | Wolff | Dec. 3, 1940 |
| 2,314,851 | Barney et al. | Mar. 23, 1943 |
| 2,442,606 | Korman | June 1, 1948 |